United States Patent Office 3,777,016
Patented Dec. 4, 1973

3,777,016
COMPOSITION AND METHOD FOR THE TREATMENT OF DAMAGED SKIN
Joseph G. Gilbert, 75 Barberry Lane,
Roslyn Heights, N.Y. 11577
No Drawing. Continuation of abandoned application Ser. No. 737,113, June 14, 1968, which is a continuation-in-part of application Ser. No. 679,365, Oct. 31, 1967, now Patent No. 3,525,340. This application Mar. 12, 1971, Ser. No. 123,809
Int. Cl. A61k *9/00, 27/00*; A61l *15/06, 23/00*
U.S. Cl. 424—80                                       2 Claims

ABSTRACT OF THE DISCLOSURE

A composition prepared from an ingredient for solubilizing bacterial and fungal organic material and skin and subcutaneous tissue which have been abraded, incised or lacerated, such as cinnamic alcohol, and an ingredient for precipitating bacterial and fungal organic material and skin and subcutaneous tissue which have been abraded, incised or lacerated, such as a tannin, or tannic acid, and preferably a film-former, such as polyvinylpyrrolidone, said ingredient for precipitating bacterial and fungal organic material and skin and subcutaneous tissue which have been abraded, incised or lacerated being present in an amount of from about 0.1 to about 50 parts per part of said ingredient for solubilizing bacterial and fungal organic material and skin and subcutaneous tissue which have been abraded, incised or lacerated, is used as a solid, a solid residue of a solution, or an aqueous or dilute alcoholic solution for topical treatment of body surface. The preferred composition is pharmaceutically active in a solution to act as a biocidal agent which also has a high tendency to arrest bleeding and also has good adhesive characteristics. The composition can also be employed as a pharmaceutically active adhesive composition with elastic and flexible dressing substrates, such as foam rubber. A surgical implement, comprised of one or more surgical clips in a coated or uncoated foam rubber or the like substrate provides a simple means for the coaptation of gaping wounds. Other features of the invention appear in the following specification.

This application is a continuation of Ser. No. 737,113, filed June 14, 1968, now abandoned, which is a continuation-in-part of Ser. No. 679,365, now U.S. Pat. No. 3,525,340.

The present invention relates to a process for topical treatment of body surfaces, treating agent and surgical implements.

A large variety of materials and implements are known for the treatment of wounds. Among these are a variety of disinfectant formulations with greater or lesser degree of astringency. There are, however, no materials available which in all respects will substantially control bleeding and will establish for prolonged periods necessary for healing the antibacterial climates desirable for preventing infection and reinfection of the wound. It is known to arrest bleeding by application of a tourniquet, but employment of such devices can lead to dangerous consequences when improperly used or left in place too long. In many occasions, when the need arises for application of a tourniquet, expert help is not readily available, and even if available, it is often not possible sufficiently accurately to monitor the time for which it has been applied and to remove the tourniquet before it has been in place longer than the permissible period of time.

Sterility is an important requirement for dressings, and the like which are intended to contact wounds or otherwise broken skin surfaces, or mucous membranes. Sterilization of surgical implements is a relatively time-consuming activity and, therefore, requires the constant availability of sterile instruments for emergency use. Surgical dressings can be maintained sterile only as long as they are sealed in containers, therefore, once the container is opened, sterility of the dressing cannot be readily maintained, especially in unsterile surroundings.

Surgical dressings have been used without or simultaneously with the use of additional mechanical devices in the treatment and protection of lacerations. Normally in the case of smaller wounds, sufficient coaptation of the edges of the wound can be achieved by the use of surgical dressings alone. In other cases, especially in cases of wide, gaping wounds, mechanical devices such as clips and/or sutures have been used. A principal drawback of such mechanical devices resides in their unsuitability for employment in emergency first-aid applications when trained personnel is unavailable. Even when the required expertise is available, the use of such devices is often insufficient for controlling bleeding. Surgical clips are individually removed in the prior art usage, from a wire mounting by special forceps commonly referred to as the Michel applicator. Subsequently a clip is transferred to the place of application while being held in the forceps, and is forced into the skin by increasing the pressure on the clip by squeezing the applicator. This procedure is repeated in the case of each clip, and the shape and size of the wound will determine the number of clips required. The applied clips are covered with a gauze or the like dressing. A variety of problems make the application of clips difficult, time consuming and cumbersome. The Michel applicator has to be accurately positioned for gripping a clip during its removal from the mounting frame, conveyance to the area of application, and while squeezing it into the skin. The first step is generally carried out by an assistant, and then the applicator with the clip held fast in it, is handed over to the person inserting the clip. This maneuver often results in a premature squeezing of the applicator and consequent closure of the clip, or in prematurely releasing the clip from the applicator.

Wounds require periodic topical treatment, most usually to create from time to time the antiseptic conditions necessary for heating and the like. This generally involves removal of the dressing, and after treatment, the application of new dressing. The application of a dressing often requires considerable skill acquired by training and/or experience. It is often impossible to apply the adhesive-type dressings of the prior art over hairy or curved body surfaces, bony joints and the like to stay in place for a sufficient length of time. Certain forms of dressing, such as in the form of rolled-up gauze, often results in an applied dressing having substantial bulk and low serviceability.

Responsive to the use of bactericidal agents, the defense mechanism of microorganisms tends to react by developing mutation strains resistant to the activity of the agent. A constantly increasing number of conventional and newly developed antibiotic and bacteriostatic agents are found to be ineffectual against a growing number of resistant strains.

At the site of skin destruction excessive overgrowth of scarlike tissue, i.e. keloid formation can occur in persons having an inherent tendency therefor. Keloid formation presents functional as well as cosmetic disadvantages. The elastic-type tissue normally present in a well-healed scar, is absent and therefore, the scar is more easily torn or broken under stress. Also, the fibrotic area lacks the natural pigment cells of normal epithelium and is, therefore, conspicuous and cosmetically unacceptable. The depigmented portion is particularly apparent in persons normally having a dark skin pigmentation.

In accordance with the present invention a composition is provided for the topical treatment of body surfaces, prepared from ingredients which comprise a first component for solubilizing bacterial and fungal organic material and skin and subcutaneous tissue which have been abraded, incised or lacerated and a second component for precipitating bacterial and fungal organic material and skin and subcutaneous tissue which have been abraded, incised or lacerated. The first ingredient is preferably cinnamic alcohol and the second ingredient is a tannin, such as tannic acid, said tannic acid being present in the composition in an amount of from about 0.1 to about 50 parts by weight per part of cinnamic alcohol. Preferably the composition further comprises a film-former, such as polyvinylpyrrolidone, said polyvinylpyrrolidone being present in an amount from about 59 to about 98.9 parts by weight per part of cinnamic alcohol and per from about 0.1 to about 40 parts, preferably 3.2 to about 12.5 parts, of tannic acid.

The present invention also relates to a process for topical treatment of undesirable conditions arising from abrasions, lacerations or incisions of body surfaces, which can repeatedly occur and require repeated treatment, wherein the body surface subject to the undesirable condition is contacted with a therapeutic agent having a plurality of pharmacologically active forms. At normally ambient conditions the agent is in a pharmacologically inactive form, but responsive to each occurrence of the undesirable condition, or on the occurrence of an extraneous condition tending to cause a reoccurrence of said undesirable condition it becomes activated by a symptom of the undesirable condition or the extraneous condition, to prevent, ameliorate or eliminate the same. The process of the present invention can be carried out by using a pharmacologically inactive solid, usually film-like residue of a solution of the aforementioned composition which is rendered pharmacologically active by being dissolved in endogenous or exogenous liquids. Endogenous liquids can include blood or plasma from bleeding which occurs originally upon a traumatic or incisional influence, secondary bleeding, secretion, or oozing subsequent to that occurrence. Exogenous liquids, such as water, by solvent action will also bring a portion of the composition into the active state, to prevent or ameliorate bleeding, infection and the like. The dry, pharmacologically inactive composition thereby serves as a repository of the composition from which an amount proportionate to the inducing cause is rendered active, on demand, by occurrence of the condition. In accordance with the surgical dressing of the present invention, a substrate, suitably an elastic and flexible substrate and preferably a webbing of a foam is coated on one side with the aforementioned composition which, in its active form, also exhibits remarkable adhesive tendencies. In accordance with a further feature of the present invention an elastic and flexible substrate, with or without an adhesive coating, such as the pharmacologically active adhesive composition of the present invention, is provided with one or more surgical clips for the simple coaptation of the edges of a wound.

The composition of the present invention is most suitably employed as a solution or as a residue of an aqueous solution prepared from the solute ingredients. The residue may be employed in the form of a powder or a film. A most suitable process for preparing such an aqueous solution from which a residue is obtained comprises the mixing of particulate cinnamic alcohol with particulate tannic acid, and then combining the resulting particulate mixture, or an aqueous solution thereof, with particulate polyvinylpyrrolidone or an aqueous solution thereof. Preferably a mixture of all of the dry ingredients is dissolved at one time. The composition may be employed as a residue of the solution of said mixture by evaporating the solvent. A film residue remains which is easily powdered by mechanical means. The aqueous solution preferably contains from about 0.3 to about 1.5, preferably 0.6 to 0.8 part of solvent per part of solute. It has been reported in the prior art that when a solution is prepared from tannic acid and polyvinylpyrrolidone, large insoluble aggregates are formed by cross-linking, and these are soluble only in weak alkalies. It has been surprisingly found that when in accordance with the present invention a mixture of tannic acid and cinnamic alcohol is added to polyvinylpyrrolidone, the water solubility of the resulting mixture is very good. Therefore, cinnamic alcohol appears to inhibit the undesirable reaction reported to occur between tannic acid and polyvinylpyrrolidone. When cinnamic alcohol and tannic acid are mixed with each other in the dry form, the temperature should suitably be below the melting point of cinnamic alcohol, because it has been found that when tannic acid is dissolved in molten cinnamic alcohol, a yellowish gum is formed, which is insufficiently soluble in water and in alcohol.

According to an important feature of the present invention, it has been discovered that the composition of the present invention, which can be easily prepared from relatively inexpensive materials, possesses a surprising combination of useful attributes. The composition is soluble in water as well as in other liquids likely to exude from wounds or from mucous membranes, but is not soluble in common hydrocarbons. When partially or completely dissolved, the solution exhibits high degree of tackiness and creates a strong adhesive bond, even after evaporation or absorption of the solvent. Good adhesion is provided even over hairy areas, and also over joints where the adhesive layer is subject to frequent intermittent flexing. The composition of the present invention in its inactive form is available for immediate activation, for controlling bleeding, and to manifest the broad-spectrum antibacterial characteristics of the active form. A dry inactive layer of the composition, therefore, serves as a repository of material which will automatically become active and available in situ upon the endogenous occurrence of a condition, such as secondary bleeding, oozing, or upon the appearance of exogenous circumstance, such as external wetting. If secondary infection of the affected portion occurs, or for other reasons it becomes hotter than the surrounding healthy areas, the increased body heat hastens activation by increasing the solution rate for more effectively making available active amounts of the composition. Consequently, in accordance with the present invention a process is provided for topical treatment of body surfaces wherein a symptom of need for treatment of a contacted body surface, brings about a responsive activation of an adjacently disposed normally inactive agent, such as by melting or dissolving the same, or both.

Another embodiment of the present invention is a surgical implement in which surgical clips, such as the well-known Michel clips are attached to an elastic and flexible substrate. Attachment of the clips to the substrate, at a time in advance of use, permits simple application of the inventive implement, even by inexperienced or untrained personnel, for coaptation of the edges of even gaping wounds and for control of bleeding. The substrate-clip combination of the present invention can be successfully employed regardless of the shape and size of the wound, and can be applied even by simple manual pressure, such as by pressing together with the thumb and index finger. The substrate can be either manufactured in standard sizes, or can be cut from a large piece with scissors to desired size and shape for any desired wound configuration. The elasticity and flexibility of the substrate, furthermore, allows the stretching and bending of the substrate to adapt the implement to any requirement which may be occasioned by the shape of the surface and wound to be treated.

A flexible and elastic substrate with a clip can be also provided with an adhesive coating, such as the double-purpose pharmacologically active adhesive of the present invention. In this manner the adhesive action can be combined with the mechanical action of the clip to cooperatively create a very strong coaptation of even extremely gaping wounds. With or without use of an adhesive layer the combination of clips with a flexible, elastic substrate obviates the need for additional dressing, such as gauze and the like.

In accordance with another feature of the present invention it has been discovered that unique bactericidal action results from the employment of a topical treating composition prepared from an ingredient which solubilizes bacterial and fungal organic material and skin and subcutaneous tissue which have been abraded, incised or lacerated such as found in body tissue and in microorganisms, and from another ingredient which precipitates such bacterial and fungal organic material and skin and subcutaneous tissue which have been abraded, incised or lacerated. In a most suitable embodiment of the composition the latter ingredient is an astringent, such as a tannin, preferably tannic acid. The solubilizing ingredient is preferably cinnamic alcohol. The bacterial and fungal organic material and skin and subcutaneous tissue which have been abraded, incised or lacerated acted upon by the composition, is comprised primarily of the amino acids of bacteria and other microorganisms starch, gelatin, components of connecting tissue such as collagen and the like. The twofold action of the composition represents a double pronged attack against microorganisms by attacking their life function as well as by depriving them of their food such as body tissue and dead microorganisms, by conversion into a form unsuitable for use as nourishment. Thus, the microorganism is subjected to an attack on its life mechanism from two different directions, which requires the building up of two different defense mechanisms, making the development of mutation strains unusually difficult. The composition of the present invention manifests its activity within 3–5 seconds of contact, but a microorganism requires about 17 minutes to duplicate itself and form another generation. In this manner a further blocking of formation of defense mechanism is provided.

The use of cinnamic alcohol presents an additional advantage when an astringent such as tannic acid is used as the component which precipitates protein. Astringents are known to have a low cell penetrability and their action is normally limited mainly to the surfaces of the cells. Normally upon application of an astringent, tissue will contract, the cell permeability becomes reduced, and the cement substance of the capillary endothelium is hardened, so that transcapillary movement of plasma protein is inhibited. This would normally preclude effective attack by materials such as tannic acid or other tannins or microorganisms other than those at or near the surface. On the other hand, it has been observed that when the composition of the present invention is placed on a blood agar plate, a zone of hemolysis appears around the deposited composition, resulting from the solubilization of protein and of the polysaccharides of the agaragar jelly. When in a control, cinnamic alcohol was omitted from the composition no such zone of hemolysis has developed. It was also observed that when the composition of the present invention is placed on a wound or the like, there is a very small initial time period in which bleeding will commence, or, if already in the process of bleeding, then it will momentarily increase, before the astringent effect starts to manifest itself. These factors indicate that there is a penetration of the composition inwardly from the surface to which it is applied, due to the initial solubilizing action of cinnamic alcohol, before the astringent activity starts to manifest itself. Consequently, the activity of the composition of the present invention is not limited only to the immedaite surface area of the part to be treated, but effective penetration to underlying areas can also be accomplished.

Tannic acid is a known astringent. Its solutions have to be freshly prepared and cannot be stored for any length of time because of its ready tendency to oxidize. Solid tannic acid will also readily oxidize when exposed to sunlight. Similarly, cinnamic alcohol is oxidized slowly on exposure to heat, light and air. The composition of the present invention can be practically indefinitely maintained in solution and under exposure to sunlight in the solid residue form, without oxidation, as would be manifested by darkening.

For various therapeutic purposes additional components can be incorporated into the composition of the present invention. For example, there can be substituted for an equal amount of polyvinylpyrrolidone 0.25–1 parts by weight, preferably about 0.5 part by weight, solids basis, of cortisone or cortisone derivative to promote healing; 0.5–2 parts by weight, preferably about 0.7 part by weight, solids basis, of benzocaine or xylocaine to obtain increased analgesic action; and 0.04–0.09 part by weight, solids basis of benzalkonium chloride if supplementation is desired, of the anti-bacterial action of the basic active composition.

In addition to the above-mentioned method of using a residue of a solution and the residue being in the form of a powder or a film, the composition of the present invention also can be employed in the form of a liquid. It is a desirable feature of the liquid form that it be a complete solution, evaporate reasonably rapidly after application, and have good storage characteristics. It has been found that these purposes can be accomplished by adding from about 0.5 to about 9 parts by weight, preferably 1.0 to 2.5 parts, per part of solute of the composition of the present invention in aqueous solution, of a pharmaceutically acceptable compatible 95% alcohol, such as ethanol or propanol, as part of the solvent. Thus, a clear, stable solution of practically indefinite shelf life can be obtained, which upon application such as by brushing, tamping, or spraying will manifest its activity, and upon reasonably quick drying, will form a protective film over the body surface to which it was applied. In characterizing the alcohol as "compatible," it is intended to denote that the alcohol is soluble in water and is a mutual solvent for the ingredients of the composition.

It is not known whether any two or more ingredients of any particular embodiment of the present invention react with each other when dissolved in an aqueous or dilute alcoholic medium. It is clear, however, that in its active form the composition of the present invention performs in a synergistic manner that is unexpected from the known pharmacological activity of its separate, individual components. For this reason, the composition of the present invention is defined in the specification and the claims, in terms of its ingredients.

Since, as stated above, it it not known whether a reaction takes place between the ingredients, the composition of the present invention, when intended to be used in the powder form, is suitably prepared by crushing the residue of a solution. There are, however, indications that pharmacologically beneficial results can also be obtained from a mixture of the powdered ingredients of the present invention when activated by dissolution in blood, perspiration, or other endogenous or exogenous liquids. Another feature of the composition of the present invention, which makes the use of a dried and crushed residue more preferable to a dry mixture of the powdered ingredients, is that the latter is hygroscopic, while the former is not. Thus, formation of lumps and other agglomerates can be avoided by utilizing a crushed residue of a solution.

Polyvinylpyrrolidone, in addition to being a film-former, is also preferred as the third component for the compositions of the present invention, because it has a detoxifying activity and the resulting composition is more soluble in the blood fluid.

The viscous solution of the composition of the present invention can be applied to one or both sides of the flexible, elastic substrate webbing, by any suitable coating technique. Substrate thicknesses of 1/16" to 1/4" or more, suitably about slightly below ⅛", have been successfully employed.

The elastic and flexible substrate webbing is preferably of a porous nature to provide some padding against traumatic influences which may be encountered, and preferably with open porosity to permit aeration of the wound. It is not necessary that the substrate be bulky, for example ⅛" thick foam rubber, such as is generally available for podiatric cushioning purposes, has been found to be very suitable as the substrate material for the present invention.

It is a further feature of some embodiments of the pharmacologically active adhesive compositions of the present invention that when formed into a film and dried, they can become brittle upon flexing of the substrate, the layer cracking along the lines of flexure and in adjacent areas. The number of cracks is enhanced upon application, pressing of the dressing onto skin surfaces, and the fissures provide aeration of the wound through the adhesive layer militating thereby against the occurrence of gas gangrene and the like. This foam rubber webbing fulfills all requirements of elasticity and plasticity, and if desired, it can be easily cut to fit the size of any wound with only a very small margin outside the extremities of the wound, and if necessary it can be further adapted to the shape of the wound or the nature of the surface of the body on which it appears, by stretching, twisting and the like. The open pores on the coated sides of the substrate become impregnated by the adhesive layer of the invention, thereby serving as a repository of the active material for a release thereof from time to time as the appearance of endogenous or exogenous liquids calls for activation of the composition. The dressing can be easily applied even over hairy surfaces without subsequent dislocation, especially because the moisture of the hair and the underlying skin will operate further to activate the adhesive action rather than to diminish it as was the case in many of the prior art adhesive dressings. Adhesive dressings of the present invention, when placed over wounds in hairy regions will maintain their proper location for a period of several days, whereas commercial adhesive-type first-aid bandage as well as simple gauze adhesive-type first-aid dressings experience considerable difficulty in remaining adherent to the hairy surface. The adhesive dressing of the present invention remains well adherent during temporary exposure to moisture, such as during brief frequent washings of the affected surface, however, upon somewhat prolonged soaking, such as in water, the dressing can be removed without any pain or discomfort. Alternatively, the adhesive can be removed in the dry state because of a selective tenacity of the adhesive character. This selective tenacity is manifested in that the adhesive successfully resists normal mechanical influences tending to remove the dressing, on the other hand it does not offer such resistance to more purposeful efforts associated with an intended removal of the dressing, such as the resistance manifested by the adhesive layers of freshly applied adhesive-type dressings of the prior art.

The applied webbing with a coating of the composition of the present invention, generally will spontaneously separate from skin, within a matter of a few days, leaving a healed condition.

The medicated dressing of the present invention can be employed in the case of wounds having a wide bed, with only a relatively narrow opening through the skin. In wounds of this nature a coated substrate, such as foam rubber padding, and preferably coated on both sides with the composition of the present invention, can be packed through the narrow opening. Suitably, the coated foam rubber is wrapped within gauze, with a portion of the gauze extending beyond the coated foam webbing. This extending portion can be used to increase the pressure on the inserted foam rubber for further control of bleeding such as by packing tightly through the narrow opening. The gauze separates from the coated foam webbing, and extending outwardly through the narrow opening, can also be used as a bandage to be wrapped around the affected body portion.

The particular embodiment of the present invention, most suitable for a given condition, generally depends on the size and nature of the condition to be treated. For example, in the case of superficial lacerations, non-gaping cuts, bruises and wounds where no coaptation is necessary, it will suffice to apply a film of the solution of the composition of the present invention. In the case of deeper cuts, with only slight separation of the edges and modest opening, a substrate, such as foam rubber webbing, covered with a residue of a solution of the composition of the present invention, will be sufficient for coaptation of wound edges and padding the site. When a wound is somewhat more, but still not excessively gaping, a so-called adhesive suture can be used for coaptation of the edges, with a webbing coated with the composition of the present invention being disposed between the wound and the adhesive suture. In the case of most widely gaping wounds a webbing with the preinserted Michel clips can be advantageously employed.

Embodiments of the present invention have been employed in the treatment of various conditions, as disclosed in greater detail hereinbelow.

A mixture was prepared from 2.92 g. tannic acid powder U.S.P. 0.71 g. cinnamic alcohol powder, and 28.32 g. polyvinylpyrrolidone sold by the GAF Corporation under the trade designation K29–32, that is, a mixture of about 8.8 parts tannic acid, about 2.1 parts cinnamic alcohol, and about 85 parts polyvinylpyrrolidone, by weight. The mixture was dissolved in 22.5 ml. water during agitation in a Waring Blendor, and the resulting viscous, yellowish solution was spread with a spatula over one side of a 3/32 inch thick white foam rubber webbing. About 29.6 ml. solution covered about 258 $cm.^2$ of the substrate. After drying at room temperature, a thin, pale-yellowish, dry-to-touch film was obtained at the residue of the solution.

The coated foam rubber webbing was used in the infirmary of a manufacturing plant for the treatment of over 160 lacerations of varying sizes and types. The patients were workers whose affected body surfaces, in almost all instances were covered with grease and oil.

Of the total number of workers treated, 75% were Negroes, and half of these were predisposed to keloid formation by evidencing keloid scars of earlier lacerations. The lacerations treated in all instances in accordance with the present invention, after healing, did not show any evidence of keloid formation.

Many therapeutic agents used in the prior art for the treatment of lacerations, contain hexachlorophene, and it is well known that when surface areas to be treated are soiled with grease and oil, the hexachlorophene-treated areas have to be rinsed with saline solution and water, and then tamped dry to remove any hexachlorophene which may have become trapped in the greasy contaminants, to prevent the agent from becoming absorbed through the avulsions of the body surface. If hexachlorophene-containing agent is not removed, convulsions and other systemic reactions can occur.

Of the first 160 consecutive lacerations treated, 21 involved avulsion of skin, whereby areas of the body were denuded from skin. In all of these cases the affected areas were soiled with grease and oil. The coated foam rubber padding in accordance with the present invention, was placed directly over the soiled body areas, and up to complete healing no adverse systemic reactions were observed.

The avulsions and linear as well as stellate lacerations in the above 160 cases treated, ranged upwardly from ¼ inch length. Most of the lacerations were about ½ inch or slightly longer. They were generally of ⅛–¼ inch in depth and were usually accompanied by severe bleeding. In many instances where multiple lacerations were involved, the additional sites were treated in accordance with prior art procedures for control purposes.

In about ½ of the cases treated, the dressing of the present invention was pre-sterilized by treatment with ethylene oxide gas, but in the other half of the cases the material was not pre-sterilized in any manner. There was no occurrence of infection in any of the cases treated in accordance with the present invention. This evidences the highly antibacterial and fungicidal character of the composition of the present invention. The coating composition begins to dissolve in blood, serum, or perspiration, in a matter of 3–5 seconds, and completely controls bleeding depending on the depth and length of the laceration usually within 4–5 minutes even in the more severe cases. Bleeding was controlled without the occurrence of secondary bleeding in all cases but one. In the case of the one exception half of a fingernail was completely avulsed and immediately after treatment the patient returned to his usual occupation, and then bruised the finger again, more than once. Bleeding occurred during that night, it soaked through the dressing by the following day, evidencing dry clots adjacent to the avulsed area. On the following morning the original dressing was replaced without any evidence of further bleeding.

With the above-mentioned exception, the foam rubber webbing acted as a cushion and protection against subsequent trauma as well as aiding and regulating the surface temperature of the underlying skin, but providing enough ventilation through the porosity, such as to prevent anaerobic infection.

It was generally observed in the case of freely bleeding wounds that when a solution of the composition of the present invention is placed on the bleeding area, within 5 minutes a dome-like pearl is formed, in another 10 minutes the pearl shrinks and shrivels to a flat, rough surface, entrapping the flow of blood within.

In a more aggravated case, a Negro patient, with evidence of predisposition for keloid formation came to the dispensary with a metal tourniquet applied in the middle third of the thigh. The patient was still bleeding from a 12 inch long x 1 inch deep laceration gaping 2 inch wide and from another 6 inch long x 1 inch deep laceration of ⅝ inch width. As the tourniquet was removed, the bleeding increased and both wounds were immediately packed with the coated foam rubber webbing of the present invention. This dressing was left in situ for about five minutes, by which time bleeding was completely controlled. The foam rubber packing was gradually teased out of the wounds and then coated foam rubber strips were applied, spaced from each other, to reunite the wound edges until the maneuver was completed. Finally a coated foam rubber webbing was superimposed over the entire area of the lacerations. Later a physician used 18 sutures to close the dry wound. Complete healing took place within two weeks without any evidence of keloid formation.

It was observed that the pharmacologically active adhesive composition of the present invention is not affected by grease and oil and, contrary to prior art surgical adhesives, its adhesive qualities were manifest even though such a soiled layer of skin.

A piece of substrate foam rubber webbing, coated in accordance with the present invention, was placed onto a blood agar plate previously contaminated with a culture of hemolytic *Staphylococcus pyogenes albus,* and *aureus* and alpha Streptococcus. An uncoated, but otherwise identical foam rubber webbing was placed alongside, and then the assembly was incubated for 48 hours. No evidence was found of any colonies of growth of organisms under the area covered by the coated webbing, but several white colonies of growth were clearly in evidence on the surface of the blood agar portion covered by the uncoated foam rubber control. Reinoculation in a broth medium and reincubation for 72 hours, similarly failed to give rise to any growth of organisms in the area covered by the coated substrate.

Bleeding time determinations were carried out on a large rabbit in accordance with the Duke method, as described in Bray's Clinical Laboratory Methods, 6th ed., C. V. Mosby Co., St. Louis, 1962. A No. 15 Bard-Parker pointed knife was thrust into the skin of the rabbit, followed by free bleeding, then the time was recorded when the bleeding stopped spontaneously. Compared to a generally 2–4 minute period required for stoppage of bleeding in the case of a wound covered by an uncoated foam rubber, coverage of the wound with a coated foam rubber in accordance with Example 1 resulted in a bleeding stoppage within up to 40–60 seconds sooner.

Three shallow incisions, each ¼ inch long, were made with an unsterile No. 11 Bard-Parker knife, at the base of the left index finger of an individual. Three different solutions were swabbed over a respective incision. The first solution was prepared by dissolving 0.5 g. each of tannic acid and cinnamic alcohol, and 99 g. polyvinylpyrrolidone in 15% by weight aqueous ethanol solution; the second, by dissolving 10 g. tannic acid and 2 g. cinnamic alcohol and 98 g. polyvinylpyrrolidone in a 33% by weight aqueous ethanol solution; and the third, by dissolving 20 g. tannic acid, 5 g. cinnamic alcohol, and 75 g. polyvinylpyrrolidone in a 70% by weight aqueous ethanol solution. The bleeding stopped within a few minutes in all cases, most quickly in the case of the second solution, and all incisions healed without infection, in a matter of a few days.

Deep lacerations were made with an unsterilized knife in the uncleaned abdominal skin of a large rabbit down to the peritoneum. Free bleeding was obtained from incisions of slightly less than an inch long and approximately ¼" gaping. The wound edges were pulled together with the thumb and forefinger and a foam rubber-backed dressing prepared in accordance with Example 1 was placed over the incision. The anesthesized animal was returned to its cage and allowed to move freely as well as have access to the covered area. The animal was free to rub the areas of its body covered with the self-adherent dressing against the cage, and within an average of 5 days the rubber dressing was removed by the animal. No evidence of infection could be noted, and in 2 out of 3 incisions the wounds were closed and healed. In ⅓ of the cases a gaping wound was noted without the evidence of infection, the wound being dry and non-secreting in character.

A 3 inch long incision was made in the abdomen of a large rabbit in an area cleared by a hair clipper, but without sterilization of the surface or the knife. The cut was made all the way to the peritoneum with the occurrence of free bleeding. Gaping of ½ to 1 inch could be observed. The edges of the wound were brought together as far as possible, and coated rubber dressing in accordance with Example 1, with affixed Michel clips, was placed over the wound and the clips were squeezed together individually about their exposed edges. Bleeding was immediately controlled and the coated surface of the rubber substrate became adherent to the underlying skin. Although within an average of 5 days the dressing became torn off by the rabbit and the wound was open, no evidence of infection could be noted and the wound was dry and non-secreting.

A wedge-shape piece of the auricle of the ear of the rabbit was cut away. The location was selected to minimize, as far as possible, the freedom of the rabbit to paw and rub the wound. A coated foam rubber segment was attached by adhesion and with a clip onto the posterior of the ear while bringing the edges of the wound together with one hand and using the thumb and forefinger of the other for squeezing the clip around the edges of the wound. Two more clips were then applied, all clips enclosing the interior of the auricle. Bleeding was immediately controlled. After 5 days two of the clips became removed by the rabbit, but the wound was completely closed and healed, without any evidence of infection A large, Z-shaped incision of approximately 4½ inch length was made with an unsterilized knife into the unsterilized side of the abdomen of the rabbit down to the peritoneum, with resulting free bleeding. A badly gaping, more than 1 inch wide wound was obtained. A large piece of coated foam rubber, prepared as mentioned above was placed over the irregular laceration, together with Michel clips, in a fashion that the angular changes in direction of the Z-shape were deliberately not clipped together and left somewhat uncovered. Rapid stoppage of bleeding was observed. About 18 hours later the wound was still widely gapping with the only clips remaining at the very distal edges of the regular wound, but these portions were all well approximated and not infected. No infection could be seen in the remainder of the jagged wound and the wound was dry and non-secreting already 18 hours after the post-operative phase. After 5 days the distal ends of the wound where the clips were retained, were well healed, while the remainder of the wound, even though gaping, was dry and without any evidence of infection.

In the case of tooth extraction from cardiac patients who are under anticoagulant medication, such as warfarin, medication is usually stopped about three days prior to extraction, and three days following and in the interim the patient is treated with vitamin K to coagulate and to neutralize the warfarin level and to reduce any excessive bleeding attendant to the extraction. It is to be noted that no vasoconstrictor such as epinephrine is used locally to prevent further bleeding in such cases. It is also common practice to insert repetitive packings into the socket of an extracted tooth and have these placed under pressure by biting.

An infected tooth was extracted from a cardiac patient who had a systolic blood pressure of up to 240, and was under constant warfarin medication. There was no interruption of the medication prior to, during, or after the extraction, and no vitamin K nor any vaso-constrictors were employed. After extraction, a small, tampon-shaped piece of unsterilized foam rubber coated with the composition of the present invention and wrapped in a single thin layer of gauze, with a small length of excess gauze provided, was placed into the bleeding socket of the extracted tooth and the teeth clenched in the usual manner to hold it in situ. After 5 minutes, the packing was removed by pulling at the extra length gauze portion, and only a very slight trickle of blood appeared. Another, like packing was applied, and removed about 30 minutes later. There was no evidence of bleeding during this time and thereafter, the removed packing showed no saturation with blood, only a slight appearance of blood on the surface. The socket healed well, without infection. Altogether, there was less bleeding than in the cases where vitamin K and vasa-constrictors are used.

Since then under the same conditions a single packing of the impregnated foam rubber with its single thin layer of gauze has been placed in the tooth socket in the above described manner and in a matter of 30 minutes, on the average, served to control the bleeding.

In the case of a patient having congenital telangiectasia of the nose with bleeding, placement of a coated foam rubber piece of the present invention, resulted in rapid stoppage of bleeding on all 10 occasions of the treatment.

What is claimed is:

1. A composition for the topical treatment of damaged skin and subcutaneous tissue of a living body which comprises the product formed by mixing and dissolving in water about 2.1 parts of cinnamic alcohol, about 8.8 parts of tannic acid and about 85 parts of polyvinylpyrrolidone by weight and driving off the water.

2. A process for aiding the reparation of damaged skin and subcutaneous tissue of a living body which comprises contacting damaged skin and subcutaneous tissue of said body with an effective amount of a composition which comprises the product formed by mixing and dissolving in water about 2.1 parts of cinnamic alcohol, about 8.8 parts of tannic acid and about 85 parts of polyvinylpyrrolidone by weight and driving off the water.

References Cited

UNITED STATES PATENTS 3,073,794   1/1963   Stoner _____ 424—80

OTHER REFERENCES

Chemical Abstracts, Subject Index, vol. 55, p. 542s, 1961.
Chemical Abstracts, vol. 55, p. 23939b, 1961.
Husa. Pharmaceutical Dispensing, 1959, p. 432.
Lilly Product Information, pp. 3–5, 1967.

ALBERT T. MEYERS, Primary Examiner
N. E. DREZIN, Assistant Examiner

U.S. Cl. X.R.
424—180, 343